(12) United States Patent
Kim

(10) Patent No.: US 6,346,777 B1
(45) Date of Patent: Feb. 12, 2002

(54) LED LAMP APPARATUS

(75) Inventor: Jaenam Kim, 2-303 New World Apt., 942-7, Mansu 5-dong, Namdong-gu, Incheon 405-245 (KR)

(73) Assignees: Ledart Co., Ltd., Seoul; Jaenam Kim, Incheon, both of (KR)

( * ) Notice: Subject to any disclaimer, the term of this patent is extended or adjusted under 35 U.S.C. 154(b) by 0 days.

(21) Appl. No.: 09/704,762

(22) Filed: Nov. 3, 2000

(51) Int. Cl.$^7$ ................................................ H05B 37/00
(52) U.S. Cl. .......................... 315/185 S; 315/185 R; 315/200 A; 315/294; 362/800; 340/815.45; 345/84
(58) Field of Search ......................... 315/185 S, 185 R, 315/169.1, 169.3, 200 A, 192, 294, 309, 312, 325; 362/234, 240, 800, 806; 340/815.4, 815.45, 815.53; 345/84, 124, 125, 141

(56) References Cited

U.S. PATENT DOCUMENTS

| | | | | |
|---|---|---|---|---|
| 4,773,032 A | * | 9/1988 | Uehara et al. ......... | 364/709.04 |
| 6,072,280 A | * | 6/2000 | Allen ..................... | 315/185 S |
| 6,265,984 B1 | * | 7/2001 | Molinaroli ............... | 340/815.4 |
| 6,278,919 B1 | * | 8/2001 | Hwang et al. ............ | 701/29 |

* cited by examiner

Primary Examiner—Haissa Philogene
(74) Attorney, Agent, or Firm—The Law Offices of Eugene M. Lee, P.L.L.C.

(57) ABSTRACT

An LED lamp apparatus comprises a plurality of LED lamps including at least one LED chip mounted on a printed circuit board, on which a driver circuit and/or a control circuit are provided in a printed circuit pattern to drive and/or control the LED chip, at least one female lead electrode terminal constituted as a hollow coupling pin to be inserted into at least one through holes for at least one power source terminal and a control signal tenninal and a body made into a unit of the LED lamp, using transparent or translucent epoxy resin, in which the LED lamps are arranged in series or parallel to form a predetermined block, the driver and control circuits are respectively or collectively provided in the block, and one block or a plurality of blocks arranged in series or parallel are made into a body to be molded into transparent or translucent epoxy resin to form a case.

5 Claims, 4 Drawing Sheets

LED LAMP APPARATUS

BACKGROUND OF THE INVENTION

The invention is related to providing an LED application technology, and particularly, to providing an LED lamp apparatus including a plurality of LED lamps of a plug-in type that gives the flexibility to its applications using the LED lamp.

DESCRIPTION OF THE BACKGROUND

Generally, an LED (Light Emitting Diode: called "LED" below) has been mostly used in a display device and its use range is now inclined to be extended to the use of illuminating equipments or mechanism. The LED is a semiconductor diode made of Galium Arsenide(GaN), Galium Phosphide (GaP), Galium Nitride(GaN), Silicon Carbide(SiC), etc., according to the color, the luminance and the intensity. The LED converts electric energy efficiently into spontaneous and non-coherent electromagnetic radiation at visible and near-infrared wavelengths by electro-luminescence at a forward-biased pn junction. In other words, upon being biased at the avalanche breakdown region, the pn junction forces the LED to emit visible light rays. And, in an event that the LED is adapted to the display device, a power source is conventionally applied through a multiplexing circuit or other power applying circuits to the LED in order to reduce the power consumption of the display device. Also, the LED has been used in an independent or matrix structure.

In light of these points, the LED might be diversified in its use or applications such as an LED lamp light, an illuminating device using the LED lamp, a traffic light, etc., but these appliances have been restrictively used only for its inherent purpose according to a predetermined arrangement of the LEDs, so that their use range was limited.

In other words, the LED lamp structures have been provided in a pin-header type to have a lead electrode terminal of a male type with respect to the power source. And thus, when the LED lamp is mounted in a circuit for the predetermined purpose of an appliance, at least one lead electrode terminal is projected out of the LED structure thereby to require a separate electrical socket device for the electrical connection to the LED lamp. Furthermore, a printed circuit board appropriate for the LED structure or the socket device must be manufactured. For it, the total configuration of the LED structure becomes complex, and its use range is greatly limited.

In order to resolve these disadvantages, a typical technology is disclosed in U.S. Pat. No. 6,072,280 which is related to an LED light string employing series-sparallel block coupling. In the patent, an LED light string employs a plurality of LEDs wired in a series-parallel block. Further, each series-parallel block may be coupled in parallel, the parallel connection coupled across a supply voltage through an electrical interface. LEDs of the light string may comprise either a single color or an LED including multiple sub-dies, each sub-die of a different color. LED series-parallel blocks of the light string may be operated in continuous, periodic or pseudo-random state. The LED light strings may provide polarized connectors to couple LED lamp strings end to end and in parallel with the supply voltage. The electrical interface may have one or more parallel outputs and a switch so as to operate multiple LED light strings in continuous, periodic or pseudo-random states. The LED light string may be adapted so as to employ LEDs of different drive voltages in each series section of the series-parallel block.

The patent comprises the LED light string in which a plurality of LEDs are connected in series to each another by means of the sub-dies, and the series LED blocks are arranged in parallel to each another, but fails to disclose what the series connection of the LED lights is made. Also, the patent discloses the use of the sub-die for the connection of the LEDs, but the detailed structure of the sub-die is not represented to show the connection between the LED and the sub-die, the LEDs or the sub-dies. Only, the patent is an improved technology of connecting the serial LED light blocks in parallel to each another. It simplifies the configuration of a voltage source circuit and facilitates the control of the voltage supply.

But, the patent limits the use range of a product to the level that a plurality of LEDs are simply coupled with each another to form serial-parallel blocks of LED light string. For example, it may be limited to an illuminating device on an object for decorating purposes. For it, the patent is restricted to the use range, so it fails to disclose the product having the flexibility.

Accordingly, an object of the invention is to provide an LED lamp apparatus including a plurality of LED lamps which can afford the flexibility to its related products.

Another object of the invention is to provide an LED lamp apparatus comprising a predetermined single unit of a single LED lamp or a plurality of LED lamps integrally mounted in a case, in which the LED lamp has at least one female lead electrode terminal.

Another object of the invention is to provide an LED lamp apparatus including a plurality of LED lamps to facilitate the operation control thereof, respectively or collectively, thereby giving the flexibility of various designs, uses and shapes to products using the LED lamp.

SUMMARY OF THE INVENTION

According to the invention, an LED lamp apparatus comprises an LED lamp including at least one LED chip mounted on a printed circuit board, at least one female lead electrode terminal fitted into at least one through hole which is perforated on the printed circuit board, into which a metal power source terminal is formed or a hollow coupling pin is inserted and a body forming an unit of the LED chip, the female terminal, the printed circuit board, etc. with transparent or translucent epoxy resin; a driver circuit mounted on the printed circuit board and electrically connected to the female lead electrode lead terminal to drive the LED chip; a control circuit mounted to control the operation of the LED lamp adjacent to the driver circuit or driven LED lamp; and a plurality of cases formed as a block including a plurality of the LED lamps connected in series or parallel to each another, in which the block is sealed in the case with transparent or translucent epoxy resin.

The LED lamp apparatus is constructed as follows. At least one LED chip is mounted on a printed circuit board on which a driver circuit and/or a control circuit are provided in a printed circuit pattern to drive and/or control the LED chip. At least one female lead electrode terminal is constituted as a hollow coupling pin to be inserted into at least one through hole for at least one power source terminal and a control signal terminal. An LED lamp is made into a unit body to integrate the LED chip, the printed circuit board and the female lead electrode terminal with each another, using transparent or translucent epoxy resin. A plurality of the LED lamps are arranged in series or parallel to form a predetermined block. One block or a plurality of blocks arranged in series or parallel are made into a body to be molded into transparent or translucent epoxy resin to form a case.

Therefore, the invention enables LED lamps formed into various structures such as the LED lamp block to represent a character, graphic or picture having various colors and the operation of the LED lamp or LED lamp blocks to be controlled, individually or collectively, thereby to provide various presentations. In other words, the LED lamp apparatus has the flexibility to diversify its use range such as LED lamp illuminating devices, LED lamp display devices, LED lamp advertising devices, etc.

BRIEF DESCRIPTION OF THE DRAWINGS

The invention now will be described in detail with respect to the accompanying drawings, in which.

DETAILED DESCRIPTION OF THE INVENTION

Figure 1:
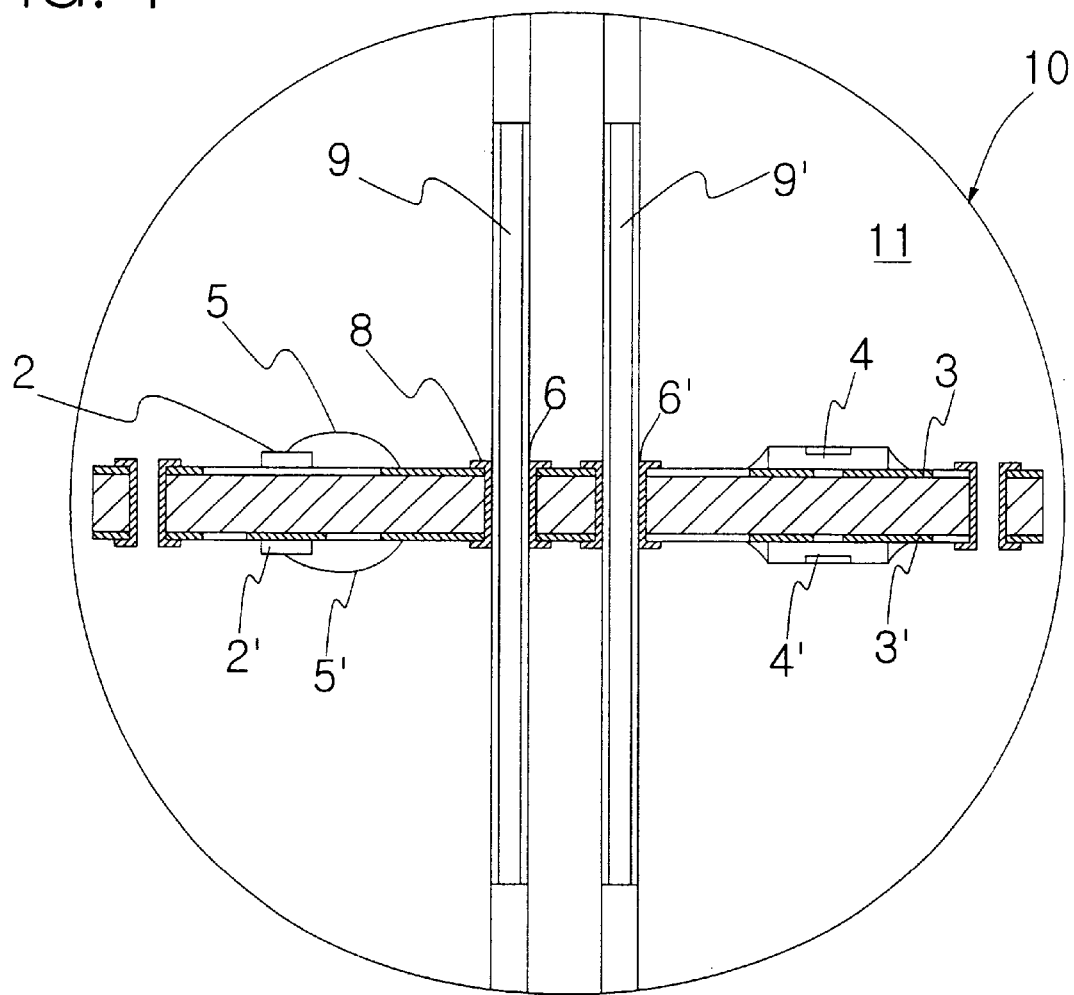
FIG. 1 is a cross-sectional view illustrating the configuration of an LED lamp according to the principle of the invention.
Figure 2:
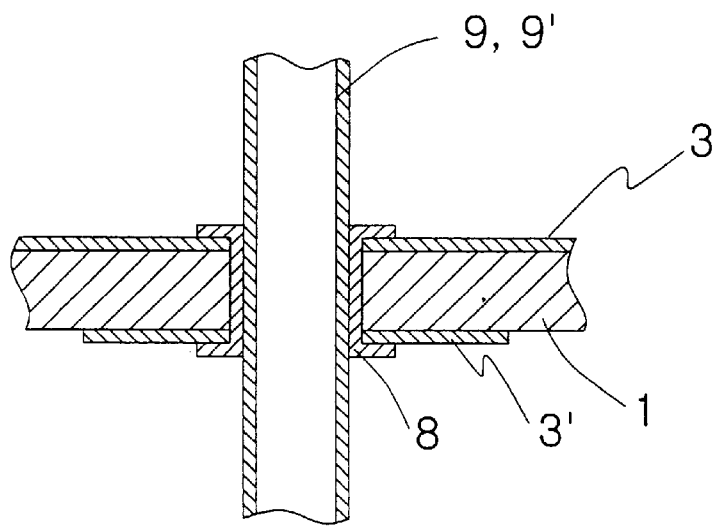
FIG. 2 is an enlarged cross-sectional view illustrating the electrical connection state of a female lead electrode terminal of the LED lamp of FIG. 1.

As shown in FIGS. 1 and 2, a printed circuit board 1 (called "board" below) is provided with a printed circuit formed on both side surfaces thereof, on which LED chips 2 and 2' are properly arranged. Patterns 3 and 3' are written on both side surfaces of the board 1 to form a driver circuit and/or a control circuit of the LED chips. Elements 4 and 4' are mounted on the patterns 3 and 3' to form the control and/or driver circuits of the LED chips 2 and 2', wherein the driver and control elements may be transistors, resistors, photo-couplers, etc. used in SMT (Surface Mount Technology) field. Of course, the board 1 may be one-side surface. The patterns 3 and 3' are made of a metal such as a copper, etc. having the good conductivity, and the LED chips 2 and 2' may be bonded by means of wires 5 and 5' on a circuit pattern or patterns 3 and 3' as shown in the drawings.

On the other hand, through holes 6 and 6' according to the invention are perforated on at least two positions of the board 1 for the power supply and control of the driver and/or control circuit. Conductive layers 8 and 8' or pattern wire arrangement having the higher conductivity such as nickel, etc. are extended into the through holes 6 and 6' with being electrically connected to the patterns 3 and 3'. The conductive layer 8 and 8' may be electrically connected by means of the wires 5 and 5' to the LED chips 2 and 2'. Female lead electrode terminals 9 and 9' are formed as a power source electrode or a control terminal, each of which is closely fitted into the through holes 6 and 6' coated by the conductive layers 8 and 8'. At that time, the female lead electrode terminals 9 and 9' are respectively passed through holes 6 and 6' to secure the electrical contacting with the conductive layer 8 and 8', both ends of which are projected at a predetermined length out of both side surfaces of the board 1. Also, the female lead electrode terminals 9 and 9' are hollowed throughout its length or at a predetermined portion adjacent to both ends thereof, if necessary. Therefore, after the female lead electrode terminals 9 and 9' are electrically connected with the patterns 3 and 3', and the LED chips 2, 2' and elements 4, 4' are mounted on both side surface of the board 1, transparent or transluscent epoxy resin 11 is moulded into a predetermined shape, for example a circular shape as shown in the drawings to form an LED lamp 10.

Herein, it is noted that the LED lamp 10 is constituted as one unit, in which at least one LED lamp 10 can be superposed to each another, or mounted on the board 1 extended leftward and rightward. Also, the length of the female lead electrode terminals 9 and 9' can be placed in the epoxy resin 11 or projected out of the epoxy resin 11.

Figure 3:
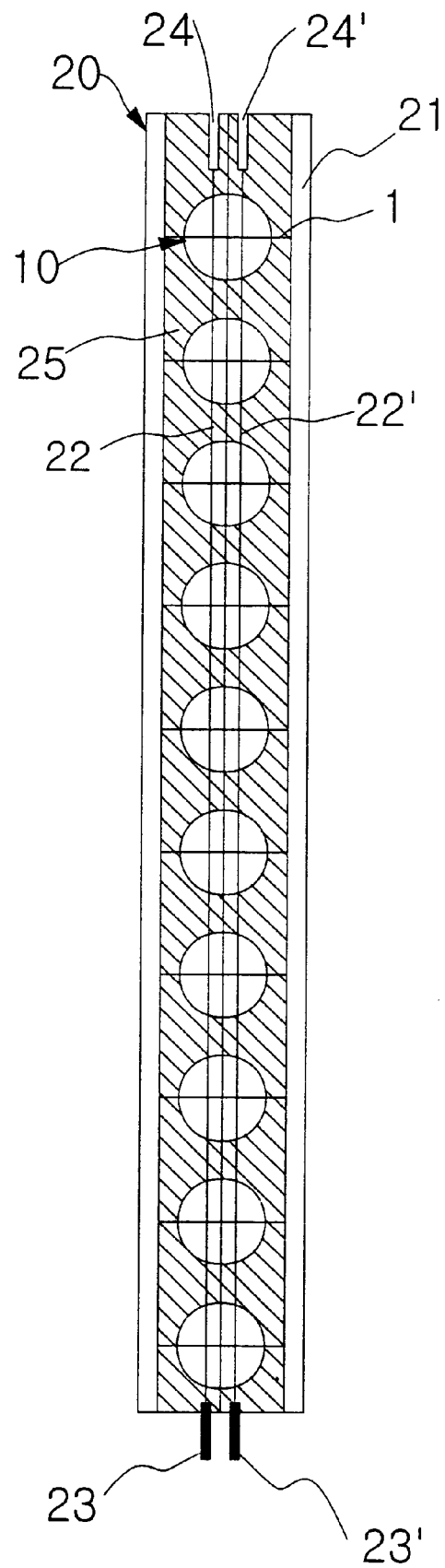
FIG. 3 is a cross-sectional view illustrating an LED lamp apparatus according to the invention.

Therefore, as shown in FIG. 3, the invention implies that a plurality of LED lamps 10 can be vertically arranged to their board 1 being respectively fixed by a predetermined means to the wall 21 of a case 20 or horizontally arranged with the board 1 being length-wisely extended. The LED lamps 10 with the female lead electrode terminals 9 and 9' enable electrical wires 22 and 22' to be selectively passed through the female lead electrode terminals 9 and 9' in turns, so that the electrical contact is secured with respect to one another, while the LED lamps 10 are electrically connected to male lead electrode terminals 23 and 23' or female lead electrode terminals 24 and 24' coupled with an electrical power source socket. Also, though not shown in the drawings, the LED lamps 10 may be horizontally arranged to be the same as their vertical configuration. The configuration is sealed in the case 20 along with epoxy resin 25 of a transparent soft material. In that case, any transparent soft material can be used except for the epoxy resin 25. A body of the case 20 may be made up of a transparent flexible material to be freely bent.

Therefore, the case 20 is constituted as a part of the invention to be used as an appliance equipment of the LED lamp 10 such as an illuminating device or the other device. And also, it is noted that a plurality of cases 20 can be arranged in series or parallel for their electrical connection.

Figure 4:
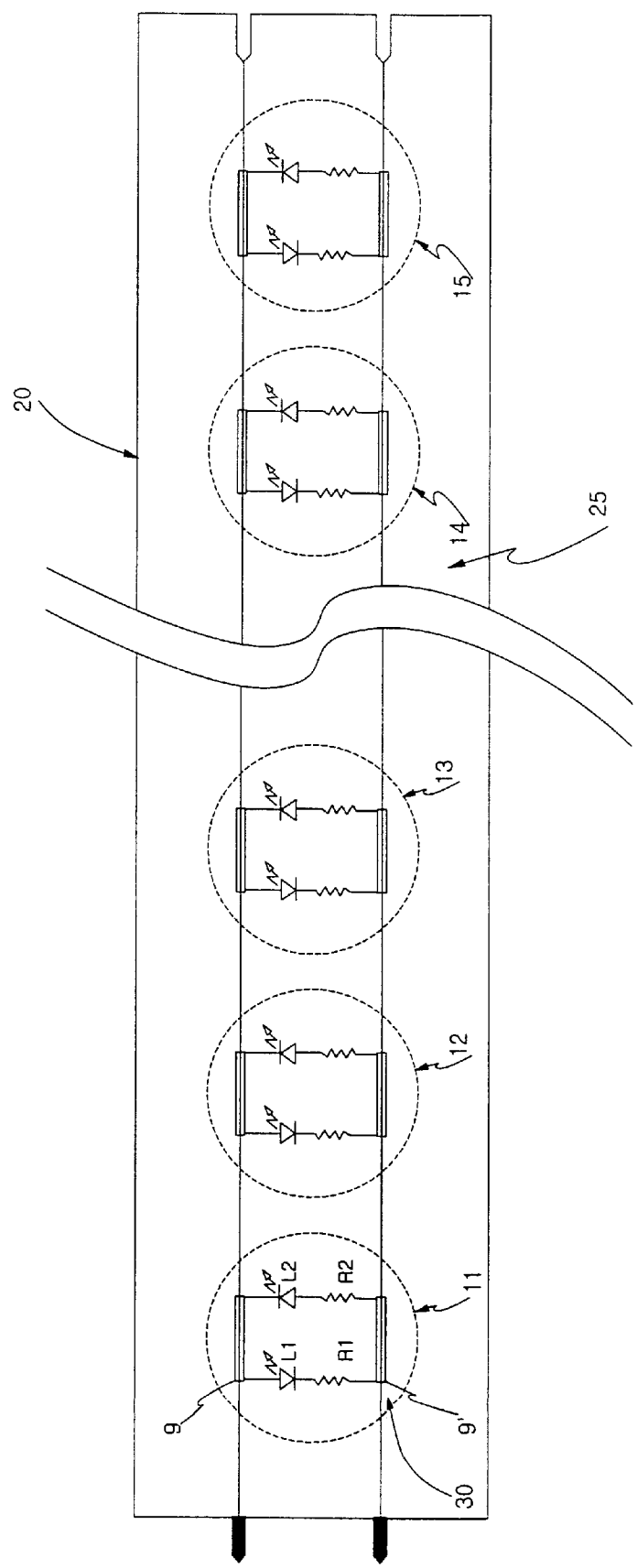
FIG. 4 is a cross-sectional view illustrating the LED lamp apparatus provided with a driver circuit to operate the LED lamp according to the invention; and, FIG. 5 is a cross-sectional view illustrating the LED lamp apparatus provided with a control circuit to control the operation of the LED lamp according to the invention.

As shown in FIG. 4, a driver circuit 30 is formed on one side or both sides of the board 1 along with the LED chips 2 and 2' to enable the assembly of LED appliances. It forces the LED lamps 10 to be lit in paralled in the case 20. In other words, as the LED lamps 11, 12, 13, 14 and 15 are sealed in the case 20 with the transparent soft epoxy resin 25, the LED chips 2 and 2' and their driver elements are mounted on both side surfaces of the board 1, to which the female electrode lead terminals 9 and 9' are electrically connected. The driver circuit 30 comprises a parallel circuit of a serially connected LED L1 and resistor R1 and other serially connected LED L2 and resistor R2. When the driver circuit 30 is applied through the female lead electrode terminals 9 and 9' to the power source, the LEDs L1 and L2 are lit. In other words, all LED lamps 11 and 15 are lit at the same time.

Figure 5:
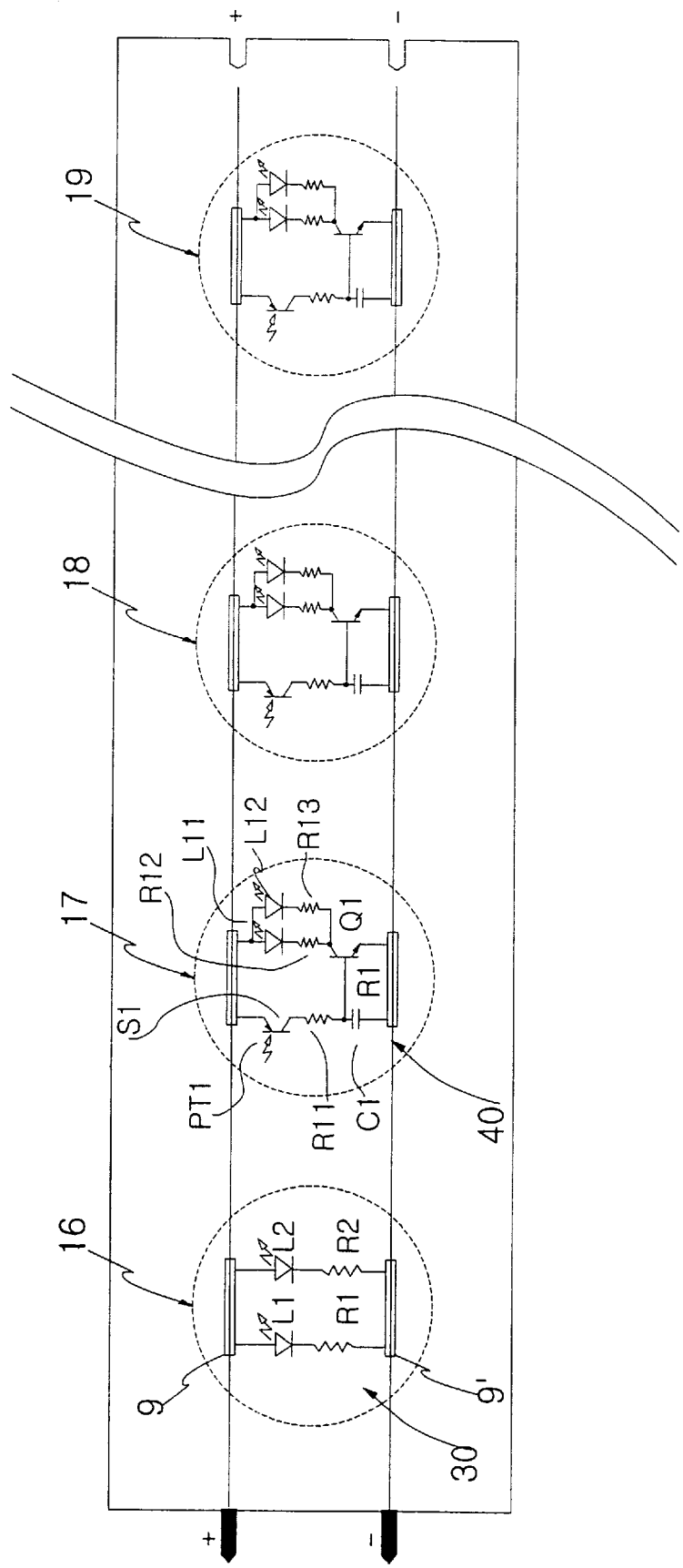

Simultaneously, as shown in FIG. 5, an LED lamp 16 with the driver circuit 30 is positioned adjacent to any one of the power source terminals of the case 20. A plurality of LED lamps 17, 18 and 19 are mounted in order in the case 20 next to the LED lamp 16 as described above, on each board 1 of which a control circuit 40 is formed. The control circuit 40 comprises a serial circuit of a serially connected photo transistor PT1, resistor R11 and condenser C1, the female lead electrode terminals of which are electrically connected to terminals of the power source, and a parallel circuit of a serially connected LED L11 and resistor R12 and a serially connected LED L12 and resistor R13, one terminal of which is connected to the collector of a transistor Q1 and other terminal of which is connected to one of the power source. The transistor Q1 is connected at the base between the resistor R11 and the condenser C1 and at the emitter to other terminal of the power source, for example a minus terminal. The control circuit 40 is operated upon the lighting of the LED lamp 15 having the driver circuit 30 to drive the photo transistor PT1. Therefore, when the LED L1 and L2 are lit and the photo transistor PT1 is operated, the transistor Q1 is operated after a predetermined delay time by means of a delay circuit of the resistor R11 and the condenser C1 connected in series and then the LEDs L11 and L12 are simultaneously lit. In the same manner as the LED lamp 17 is lit, the LED lamps 18 and 19 are lit in turn.

Accordingly, the driver circuit 30 and the control circuit 40 are respectively or simultaneously mounted on the board 1 or in the case 20 along with the LED lamp 10. If necessary, the designs of the circuits, the LED lamp and the case may be changed. For example, the case 20 is used as an illuminating device designed in a predetermined size, which can be realized in the simplest manner according to the invention. Furthermore, if a plurality of cases 20 are arranged in a predetermined graphic or character, and the driver circuit 30 and the control circuit 40 are properly arranged on the LED lamps of the case 20 to control the supply of the power source, the moving image or picture of the graphics can be realized, and the presentation of the characters as well as various advertisement effects like a neon-sign can be attained. Herein, it is noted that the driver circuit 30 is adapted to be a stating control portion for the initial lightening of the characters or graphics, and the control circuit 40 can be constituted as a representation operation control portion to express the moving image or lively pattern of the graphics or characters.

EFFECT OF THE INVENTION

As described above, the invention comprises an LED lamp having at least one female lead electrode terminal and its driver and/or control elements which are integrally mounted on a printed circuit board, in which a predetermined number of the LED lamps are sealed in the case of a transparent soft material with transparent or translucent epoxy resin, and a plurality of cases including a number of the LED lamps on the printed circuit board of which the driver circuit and the control circuit are selectively mounted, so it gives the flexibility to the applications of an LED lamp apparatus.

What is claimed is:

1. An LED lamp apparatus comprising:
    an LED lamp including at least one LED chip mounted on a printed circuit board, at least one female lead electrode terminal fitted into at least one through hole which is perforated on the printed circuit board, into which a metal power source terminal is formed or a hollow coupling pin is inserted and a body forming an unit of the LED lamp with transparent or translucent epoxy resin;
    a driver circuit mounted on the printed circuit board and electrically connected to the female lead electrode terminal to drive the LED chip;
    a control circuit mounted on the printed circuit board to control the operation of the LED lamp adjacent to the driver circuit or driven LED lamp; and
    at least one case including a plurality of blocks, each of which includes a plurality of the LED lamps connected in series and parallel to each another, the block being scaled in the case with transparent or translucent epoxy resin, in which the driver and control circuits are provided in the block by a number set for the use purpose of the LED lamp apparatus to enable various applications.

2. The LED lamp apparatus as claimed in claim 1, wherein:
    the LED lamp apparatus further comprises a plurality of cases in which a number of the LED lamps having the driver circuit and a number of the LED lamps having the control circuit are mounted at the same time.

3. The LED lamp apparatus as claimed in claim 1, wherein:
    the driver circuit includes driver elements related to the LED chips.

4. The LED lamp apparatus as claimed in claim 1, wherein:
    the control circuit is mounted adjacent to the LED lamp having the driver circuit to be operated at the time of driving the driver circuit and forces its LED chips to be delayed for a predetermined time, thereby representing the moving image and picture of characters and graphics.

5. The LED lamp apparatus as claimed in claim 3, wherein the control circuit is mounted adjacent to the LED lamp having the driver circuit to be operated at the time of driving the driver circuit and forces its LED chips to be delayed for a predetermined time, thereby representing the moving image and picture of characters and graphics.

* * * * *